US007500658B2

(12) United States Patent
Boyer et al.

(10) Patent No.: US 7,500,658 B2
(45) Date of Patent: Mar. 10, 2009

(54) DEVICE FOR MIXING AND DISTRIBUTING A GAS AND A LIQUID UPSTREAM FROM A GRANULAR BED

(75) Inventors: Christophe Boyer, Charly (FR); Daniel Svezia, Feyzin (FR)

(73) Assignee: Institut Francais Du Petrole, Rueil Mamaison Cedex (FR)

( * ) Notice: Subject to any disclaimer, the term of this patent is extended or adjusted under 35 U.S.C. 154(b) by 0 days.

(21) Appl. No.: 11/639,305

(22) Filed: Dec. 15, 2006

(65) Prior Publication Data

US 2007/0144352 A1   Jun. 28, 2007

Related U.S. Application Data

(63) Continuation of application No. PCT/FR2006/000406, filed on Feb. 21, 2006.

(30) Foreign Application Priority Data

Mar. 17, 2005   (FR) .................................. 05/02.647

(51) Int. Cl.
*B01F 3/04* (2006.01)
(52) U.S. Cl. .......................................... 261/96; 261/97
(58) Field of Classification Search ................... 261/96, 261/97, 98, 99
See application file for complete search history.

(56) References Cited

U.S. PATENT DOCUMENTS

| 1,790,224 | A |   | 1/1931 | Campbell |
| 3,232,590 | A | * | 2/1966 | Eckert ........................... 261/97 |
| 3,524,731 | A | * | 8/1970 | Effron et al. .................. 422/220 |
| 3,946,104 | A | * | 3/1976 | Forster et al. ................ 423/659 |
| 3,996,025 | A |   | 12/1976 | Gulden |
| 4,126,539 | A |   | 11/1978 | Derr et al. |
| 4,126,540 | A | * | 11/1978 | Grosboll et al. .............. 208/146 |
| 4,140,625 | A | * | 2/1979 | Jensen .......................... 208/146 |
| 4,836,989 | A | * | 6/1989 | Aly et al. ...................... 422/195 |
| 5,403,561 | A | * | 4/1995 | Koros et al. ................... 422/195 |
| 5,484,578 | A |   | 1/1996 | Muldowney et al. |
| 6,093,373 | A | * | 7/2000 | Darmancier et al. ......... 422/220 |
| 7,182,922 | B2 | * | 2/2007 | Boyer et al. .................. 422/195 |
| 2002/0020359 | A1 | * | 2/2002 | Boyer et al. .................. 118/726 |
| 2002/0021991 | A1 | * | 2/2002 | Boyer et al. .................. 422/195 |
| 2005/0062178 | A1 | * | 3/2005 | Harter et al. ................... 261/96 |

* cited by examiner

*Primary Examiner*—Scott Bushey
(74) *Attorney, Agent, or Firm*—Millen, White, Zelano & Branigan, P.C.

(57) ABSTRACT

The invention relates to a device for mixing and distributing a gas and a liquid, arranged upstream from a granular bed. The device includes a substantially horizontal lower plate, said lower plate being equipped with a plurality of risers evenly distributed over the surface of said plate, each riser having an upper part and a lower end communicating with the underside of said plate, the upper part of the risers being provided with at least one lateral orifice. A substantially horizontal upper plate is provided above which the gas and the liquid are supplied, wherein said upper plate rests on risers extending upwardly from the lower plate.

18 Claims, 7 Drawing Sheets

DEVICE FOR MIXING AND DISTRIBUTING A GAS AND A LIQUID UPSTREAM FROM A GRANULAR BED

This application is a continuation of International Application PCT/FR06/00406 filed Feb. 21, 2006, which claims benefit of priority from French Application 05/02.647 filed Mar. 17, 2005.

FIELD OF THE INVENTION

The invention relates to the sphere of devices generally arranged inside an enclosure comprising at least one granular bed. The fields of application of the invention involve the use of granular beds in chemical, physical or physico-chemical processes. The invention more particularly relates to the sphere of distribution plates generally mounted within an enclosure and intended for even distribution of a fluid at the surface of a granular bed.

BACKGROUND OF THE INVENTION

French patent FR-2,842,435 describes a device for mixing and distributing a liquid fluid and a gaseous fluid, arranged upstream from a granular bed in a reactor. The device described in this patent comprises a plate equipped with risers, said risers being fitted with an upper part opening above the plate and with a lower end communicating with the underside of the plate, the upper part of the risers being provided with lateral orifices. In this device, the liquid is carried by a tubular system from outside the reactor to the distribution plate, so that the lower end of said tubular system remains immersed in the liquid accumulated above the plate.

The drawback of such a system is that the gas and the liquid are brought separately into the reactor. In fact, it is often desirable to maximize contact between the gaseous fluid and the liquid fluid prior to distributing the mixture consisting of these fluids homogeneously over the entire section of the reactor. It is often important, notably in the case of chemical processes, for the liquid feed to be saturated with reactive compounds from the gaseous fluid, even before the mixture of gas and of liquid flows through the catalytic bed.

An additional drawback of such a system is that it can be charged only with a significant amount of liquid to fill the tubular system. The liquid velocities are therefore high at the lower end of the tubular system or at the orifices of the tubes forming the continuation of this end. This may be a source of disturbance of the interface between the gas and the liquid, which compromises the homogeneity of the mixture of gas and liquid, on the one hand, and the uniformity of the distribution of such a mixture at the upper surface of the bed, on the other hand.

International patent application WO-95/35,159 describes a distribution system for driving a gas and a liquid through the surface of a fixed bed of solids comprising a distribution plate and a plurality of tubes extending through said plate, each one of said tubes being provided with a plurality of lateral orifices extending vertically above the upper face of the plate, wherein two groups of these tubes are noticeable by the vertical position of their lateral orifices. The device described in this patent application allows, thanks to the position of the lateral orifices of the two groups of tubes, to reduce the flow of liquid flowing through the plate when the height of liquid accumulated on said plate reaches a level below which one of the group of tubes comprises no lateral orifice. Furthermore, the gas and the liquid are carried to the distribution plate by means of vertical tubes mounted on the upper face of said plate and of slots provided at the base of these tubes.

The drawback of such a system is that the gas and the liquid are fed as a mixture onto the upper face of the distribution plate. This introduction mode generates, partly because of the gas bubbling in the liquid, disturbances at the interface between the gas and the liquid.

The device according to the present invention allows to reduce or even to overcome the aforementioned drawbacks.

SUMMARY OF THE INVENTION

One object of the present invention is to provide a device, mounted in an enclosure, allowing to optimize mixing and distribution of a gas and of a liquid upstream from a granular bed or between two successive granular beds.

Another object of the invention is to provide a device allowing introduction of a gas and of a liquid into a reaction enclosure, as well as even and homogeneous redistribution of this gas and of this liquid on a granular bed.

Another object of the invention is to maximize mass transfer between the gas and the liquid upstream from the gas and liquid mixture injection point at the inlet of a granular bed. In the case of chemical processes, this allows to favour transfer of reactive compounds from the gas to the liquid. In such chemical processes wherein the reaction generally takes place in the liquid, this transfer of compounds from the gas to the liquid can be a factor limiting the reaction process. The invention allows to increase this transfer between the gas and the liquid by thus favouring the creation of homogenous bubble clouds at the interface between the gas and the liquid.

Another object of the invention is to provide a gas and liquid distribution plate allowing to prevent any unstable or localized bubbling or foaming phenomenon that could be detrimental to the gas and liquid distribution uniformity at the surface of the granular bed.

In addition to the aforementioned objects, the invention allows to solve at least the technical problem that consists in improving the distribution uniformity of a mixture comprising a gas and a liquid at the upper surface of the bed.

The invention thus relates to a device for mixing and distributing a gas and a liquid, arranged upstream from a granular bed, comprising a lower plate and a gas and liquid delivery means provided with an upper plate, the lower plate being equipped with a plurality of risers, each riser comprising an upper part fitted with at least one lateral orifice and a lower part communicating with the underside of said plate, the upper plate being provided with means for carrying the liquid to the lower plate and with gas separation and carrying means.

In an embodiment, the means for carrying the liquid to the lower plate comprise orifices evenly distributed over the surface of said upper plate.

Alternatively, these means for carrying the liquid to the lower plate can comprise at least one line provided through the upper plate whose ends are arranged so as to be immersed in the liquid accumulated at the level of the lower plate, for one of the ends, and in the liquid accumulated at the level of the upper plate, for the other.

In another embodiment, the gas separation and carrying means comprise tubes open at both ends, arranged through the upper plate and whose upper end is provided with a cover so as to allow passage of the gas only.

In yet another embodiment, the separation means for carrying the gas below the upper plate comprise an annular opening provided on the periphery of the upper plate and fitted with a rim and a cover covering said opening so as to allow passage of the gas only.

BRIEF DESCRIPTION OF THE FIGURES

Other features and advantages of the device according to the invention will be clear from reading the description hereafter of embodiments, with reference to the accompanying figures wherein.

DETAILED DESCRIPTION OF THE INVENTION

Figure 1:
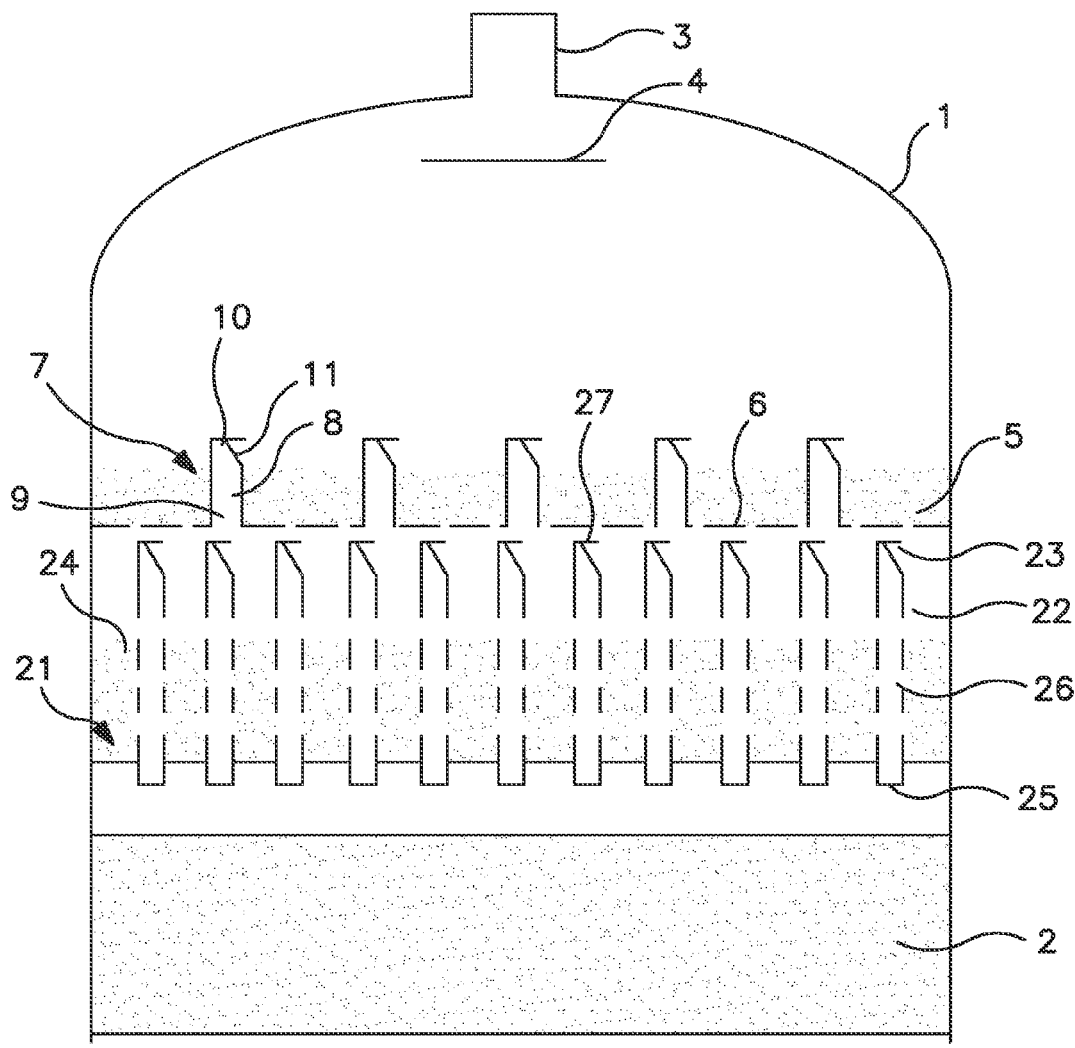
FIG. 1 illustrates in a non limitative way an embodiment of the device according to the invention wherein the means for carrying the liquid to the lower plate comprise orifices evenly distributed over the surface of said upper plate, and the gas separation and carrying means comprise tubes open at both ends, arranged through the upper plate, and whose upper end is covered by a cover so as to allow passage of the gas only.

The invention thus relates to a device for mixing and for distributing a gas and a liquid, arranged upstream from a granular bed, comprising a gas and liquid delivery means and a substantially horizontal lower plate, said lower plate being equipped with a plurality of risers evenly distributed over the surface of said plate, each riser comprising an upper part and a lower end communicating with the underside of said plate, the upper part of the risers being provided with at least one lateral orifice.

The improvement provided by the present invention lies in the fact that the delivery means comprises a substantially horizontal upper plate above which the gas and the liquid are delivered, said plate being fitted with means for carrying the liquid to the lower plate and with gas separation and carrying means.

What is understood to be a granular bed is generally a set of solid particles in form of grains, and these grains can have any shape but they most often are approximately cylindrical or spherical, with dimensions typically of the order of some millimeters. These granular solids generally have a catalytic activity.

Generally, the device according to the invention is integrated in a reactor that can contain one or more granular beds. These beds are often fixed beds, they can be successive and/or separate.

The invention is particularly well suited for use in reactors with a descending cocurrent liquid and gas flow through the fixed bed(s) of granular solids.

The device according to the invention can be arranged upstream from a granular bed, between two successive granular beds, or generally at the top of a reactor supplied with at least a liquid and a gas.

The device according to the invention mainly comprises two groups of means, a gas and liquid delivery means and a substantially horizontal lower plate.

According to one aspect of the present invention, the gas and liquid delivery means comprises a substantially horizontal upper plate above which the gas and the liquid are supplied. This upper plate generally covers the entire section of the reaction enclosure or of the reactor.

According to another aspect of the invention, the upper plate of the gas and liquid delivery means is provided with means for carrying the liquid to the lower plate.

In an embodiment concerning this aspect of the invention, the means for carrying the liquid to the lower plate comprise orifices evenly distributed over the surface of said plate. These orifices are generally dedicated to passage of the liquid accumulated on the upper plate. Thus, the liquid can pass below the upper plate, i.e. flow towards the lower plate.

Preferably, the density of the orifices of the upper plate ranges between 100 and 3000, more preferably between 500 and 3000 orifices/$m^2$.

The diameter of the orifices of the upper plate preferably ranges between 1 and 20 mm, more preferably between 5 and 10 mm.

In another embodiment, the means for carrying the liquid to the lower plate comprise at least one line through the upper plate whose ends are arranged so as to be immersed in the liquid accumulated at the level of the lower plate, for one of the ends, and in the liquid accumulated at the level of the upper plate for the other.

The upper end of the line can be positioned preferably at a height below 50 mm, more preferably level with the upper surface of the upper plate.

This position of the upper end allows passage of the liquid only.

The lower end of the line is positioned preferably at a height that is lower than the lowest level of the lowest lateral orifice of the risers of the lower plate.

This position of the lower end allows the liquid to be carried to the lower plate without disturbing the surface of the liquid accumulated at the level of said plate.

The line can preferably comprise means for controlling the liquid level in the upper plate. These means can be any means known to the man skilled in the art notably allowing to generate a pressure drop such as, for example, calibrated orifices, convergent or divergent tubes.

According to yet another aspect of the invention, the upper plate of the gas and liquid delivery means is provided with means for separating and for carrying the gas below said upper plate. These means thus have a double purpose which is to separate the gas from the liquid, on the one hand, and to carry the gas below the upper plate, on the other hand.

In a preferred embodiment concerning this aspect of the invention, the gas separation and carrying means comprise tubes open at both ends, arranged through the upper plate and whose upper end is provided with a cover so as to allow passage of the gas only.

Alternatively, the gas separation and carrying means comprise tubes having a closed upper end and an open lower end, said risers being arranged through the upper plate and having a lateral opening in the upper part thereof.

In these two cases, the density of the tubes of the upper plate can preferably range between 3 and 30, more preferably between 5 and 500 risers/m².

In another preferred embodiment of the invention, the gas separation and carrying means comprise an annular opening provided on the periphery of the upper plate and fitted with a rim, and a cover covering said opening so as to allow passage of the gas only.

This upper plate is generally used to separate the flow of gas and of liquid coming from the reactor delivery lines. Its configuration often allows to establish a sufficient liquid level to allow separation of the gas carried along in the liquid phase through impaction of the gas and liquid jets coming from the inlet of the enclosure.

Thus, the gas and the liquid are fed separately into the lower plate, the liquid being injected through the orifices provided on the upper plate and the gas being injected through said gas separation and carrying means.

In addition to the gas and liquid delivery means including the upper plate described above, the device according to the invention comprises a substantially horizontal lower plate.

As in the case of the upper plate, this lower plate generally covers the entire section of the reaction enclosure or of the reactor.

According to the invention, this lower plate is equipped with a plurality of risers evenly distributed over the surface of said lower plate, each riser comprising an upper part and a lower part communicating with the underside of said plate. These risers are generally substantially vertical. They often have a constant section.

The density of the risers of the lower plate can preferably range between 100 and 700, more preferably between 150 and 500 risers/m².

Preferably, the risers of the lower plate are prolonged below said plate over a height ranging between 10 and 100 mm. This configuration allows to prevent liquid from streaming down the lower face of the lower plate.

Preferably, the distance between the lower end of the risers of the lower plate and the upper surface of the granular bed below said plate is greater than zero and less than or equal to 300 mm, more preferably less than or equal to 100 mm. This configuration allows to maintain a good distribution between the gas and the liquid in the upper layers of the granular bed.

According to the invention, the upper part of the risers is provided with at least one lateral orifice. The upper part of the risers is preferably provided with a plurality of lateral orifices positioned at different heights.

The lateral orifices along the upper part of the risers of the lower plate are preferably distributed over at least two levels, the lowest level being above the upper face of the lower plate, at a distance ranging between 50 and 300 mm from the lower end of the risers. The lateral orifice level(s) can be separated by a height of at least 20 mm. Thus, the device according to the invention allows great flexibility in relation to flow rate variations.

The risers preferably comprise at the upper end thereof means allowing to prevent passage of the liquid through this end. These means can be a cover for example.

The lower plate is generally intended to accumulate a certain volume of liquid. The upper part of each riser, communicating with the part of the reactor above the lower plate, generally opens above the level of liquid accumulated on this lower plate. Passage of the gas and of the liquid below the lower plate occurs through the lateral orifice(s) in the upper part of the risers.

The gas and the liquid being injected separately above the lower plate, a plane interface forms between these two fluids. The liquid is advantageously injected by means of a large number of orifices in form of liquid jets of low flow rate, which allows disturbance of the interface between the liquid and the gas to be limited. Furthermore, the flow of liquid is evenly distributed over the entire section of the upper plate.

The device according to the invention thus allows the interface between the liquid and the gas to be kept plane and horizontal, so as to better control homogeneous supply of each one of the two fluids to the various risers of the lower plate.

The most part of the gas is fed into the risers of the lower plate through the lateral orifices provided in the non-immersed portion of the upper part of said risers. The liquid is fed through the lateral orifices provided in the immersed part of the upper part of the risers.

The device according to the invention allows, by means of the lower plate combined with the gas and liquid delivery means, to avoid bubbling or foaming phenomena that might appear in the liquid and disturb homogeneous supply to the risers.

More precisely, the liquid fed by the delivery means into the risers of the lower plate is generally in a homogeneous physical state that is identical for all the risers. The device according to the invention thus allows to prevent this liquid from being in the risers of the lower plate in a more or less aerated state due to the presence of part of the gas in the liquid in form of an emulsion or of very fine bubbles, as it is possible when the interface between the two fluids is greatly disturbed.

The device according to the invention described above applies to any type of reactors comprising at least one granular bed. It can in particular apply to reactors for which the flows of liquid to be distributed range between 0.5 and 100 kg/m²/s or, more usually, between 1 and 80 kg/m²/s.

The device according to the invention can find an application in all cases where the gas is in a minority proportion in relation to the liquid, i.e. when the gas/liquid volume ratio is below 1. The device according to the invention can also be used when the gas is the majority in relation to the liquid, i.e. when the gas/liquid volume ratio is above 3/1 or, more usually, below 400/1. The field of application of the device according to the invention can thus cover gas/liquid volume ratios ranging between 0 and 400, advantageously between 0 and 100.

The device according to the invention can also apply to cases where the reaction in the granular bed is highly exothermic and requires an additional fluid, most often gaseous, to be fed into the reactor in order to cool the gas/liquid mixture.

The device according to the invention can also apply to cases where the reaction in the granular bed requires close contact to allow dissolution of a compound that is most often gaseous, hydrogen $H_2$ for example, in the liquid phase. The device according to the invention applies in particular to the field of gas and liquid distributors such as those used for example for hydrotreating reactions. Examples of such hydrotreating reactions are hydrocracking, hydrodesulfurization, hydrodenitrogenation, selective or total hydrogenation of $C_2$ to $C_5$ cuts. The device according to the invention can also apply to selective hydrogenation of steam cracked gasolines, hydrogenation of aromatic compounds in aliphatic and/or naphthenic cuts, and hydrogenation of olefins in aromatic cuts.

The device according to the invention can also find applications for carrying out other reactions requiring thorough mixing of a gas phase and of a liquid phase, for example partial or total oxidation reactions, amination, acetyloxidation, ammoxidation and halogenation reactions, in particular chlorination.

In the specific field of hydrodesulfurization, hydrodenitrogenation and hydrocracking reactions, in particular when high conversions are sought in order to obtain a product containing for example less than 30 ppm (parts per million) sulfur, the device according to the invention is particularly well suited. In fact, in such cases, it is necessary to have a good distribution of the gas and of the liquid, especially of the liquid, knowing that the gas/liquid volume ratios generally range from about 3/1 to about 400/1, most often from about 10/1 to about 200/1.

The device according to the invention is also particularly well suited when using an auxiliary cooling fluid commonly referred to as quench fluid, where very good contact between this auxiliary fluid intended for cooling and the process fluids is required.

DETAILED DESCRIPTION OF THE FIGURES

For better understanding, several embodiments of the device according to the invention are illustrated by FIGS. 1 to 5. These embodiments are given by way of non limitative examples. These illustrations of the device according to the invention do not comprise all of the components required for implementing it. Only the elements necessary for better understanding of the invention are shown, insofar as the man skilled in the art can complete these representations to implement the invention.

FIG. 1 shows an embodiment wherein the flow of gas and of liquid is descending. The fluid delivery means include, at the top of a reactor 1 comprising a granular bed 2, a vertical supply line 3.

These delivery means also comprise a plane plate 4 whose function is to dissipate the kinetic energy of the jet and to distribute the gas and liquid mixture over at least a fraction of the section of reactor 1. The gas and liquid jet from supply line 3 thus impacts plate 4.

The gas and liquid delivery means furthermore comprise an upper plate 5 intended to receive the gas and liquid mixture after impact on plate 4. This upper plate comprises orifices 6 intended for passage of the liquid, and gas separation and carrying means 7. In the embodiment shown, gas separation and carrying means 7 comprise tubes 8 open at the upper ends and at the lower ends 9 thereof, arranged through upper plate 5. The upper end of each tube is provided with a cover 10 so as to allow passage of the gas only. In the embodiment shown, passage of the gas occurs by means of an opening provided by beveling 11 the upper end of tubes 8.

The number and the diameter of the orifices are often calculated so as to maintain a liquid level above the plate generally of at least 50 mm, advantageously of at least 100 mm. The number of orifices can also be selected so as to keep a density of at least 100 orifices per $m^2$, advantageously between 100 and 500 orifices per $m^2$. The flow passing through the orifices therefore essentially consists of liquid supplying the lower plate in form of jets of low flow rate. The height of the risers is generally determined so as to prevent any liquid overflow through these risers when the liquid flow rate is at the maximum value.

The gas and the liquid from upper plate 5 then supply a lower plate 21. The liquid is supplied by trickling. Lower plate 21 comprises risers 22, each one of these risers comprising an upper part 23 opening above surface 24 of the liquid and a lower end 25 communicating with the underside of said plate. The upper part of the risers is provided with a plurality of lateral orifices 26 arranged at different heights. Risers 22 of lower plate 21 are closed at the upper ends thereof by a cover 27. Thus, when orifices 6 of upper plate 5 are positioned above the risers, the liquid trickles down along the walls of the risers which they enter only through lateral orifices 26. Cover 27 covering the upper end of risers 22 can be inclined in order to favour trickling in the opposite direction to that of the orifices more particularly intended for passage of the gas.

The liquid jets from orifices 6 of upper plate 5 have low flow rates and are distributed over the entire section of the reactor. Disturbances of the interface between the gas and the liquid located above lower plate 21 therefore are of low amplitude and they are notably evenly distributed over the entire section of the reactor. Thus, the composition of the liquid phase and the liquid flows feeding the lateral orifices of the risers that are immersed are identical for all the risers. Similarly, the evolution with time of the mean level of the liquid surface in relation to the lateral orifices of these risers is identical for all the risers. Thus, the system provides good homogeneity of the composition of the gas and liquid mixtures, on the one hand, and uniformity of the flow rate of these fluids over the section of the reactor on the other hand.

Figure 2:
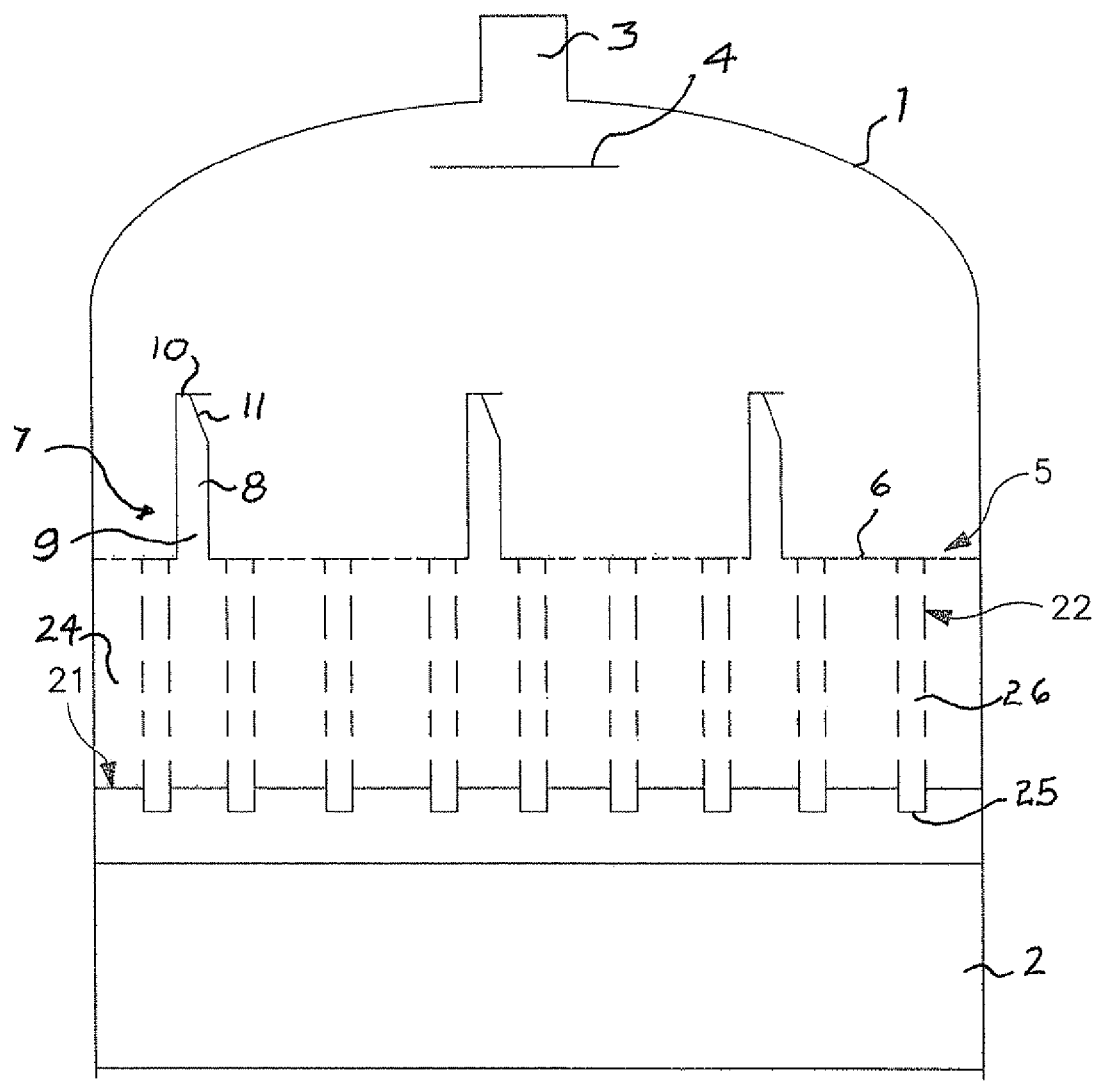
FIG. 2 illustrates in a non limitative way another embodiment of the device according to the invention wherein the risers of the lower plate serve as supports for the upper plate.

FIG. 2 shows an embodiment wherein plates 5 and 21 are secured to one another, upper plate 5 being directly supported on the upper end of risers 22 of lower plate 21. The upper plate thus closes the upper end of the risers and allows to minimize the head of the liquid between upper plate 5 and lower plate 21. The gas is then predominantly injected into risers 22 of lower plate 21 by means of one or more orifices provided in the non-immersed portion of risers 22.

Figure 3:
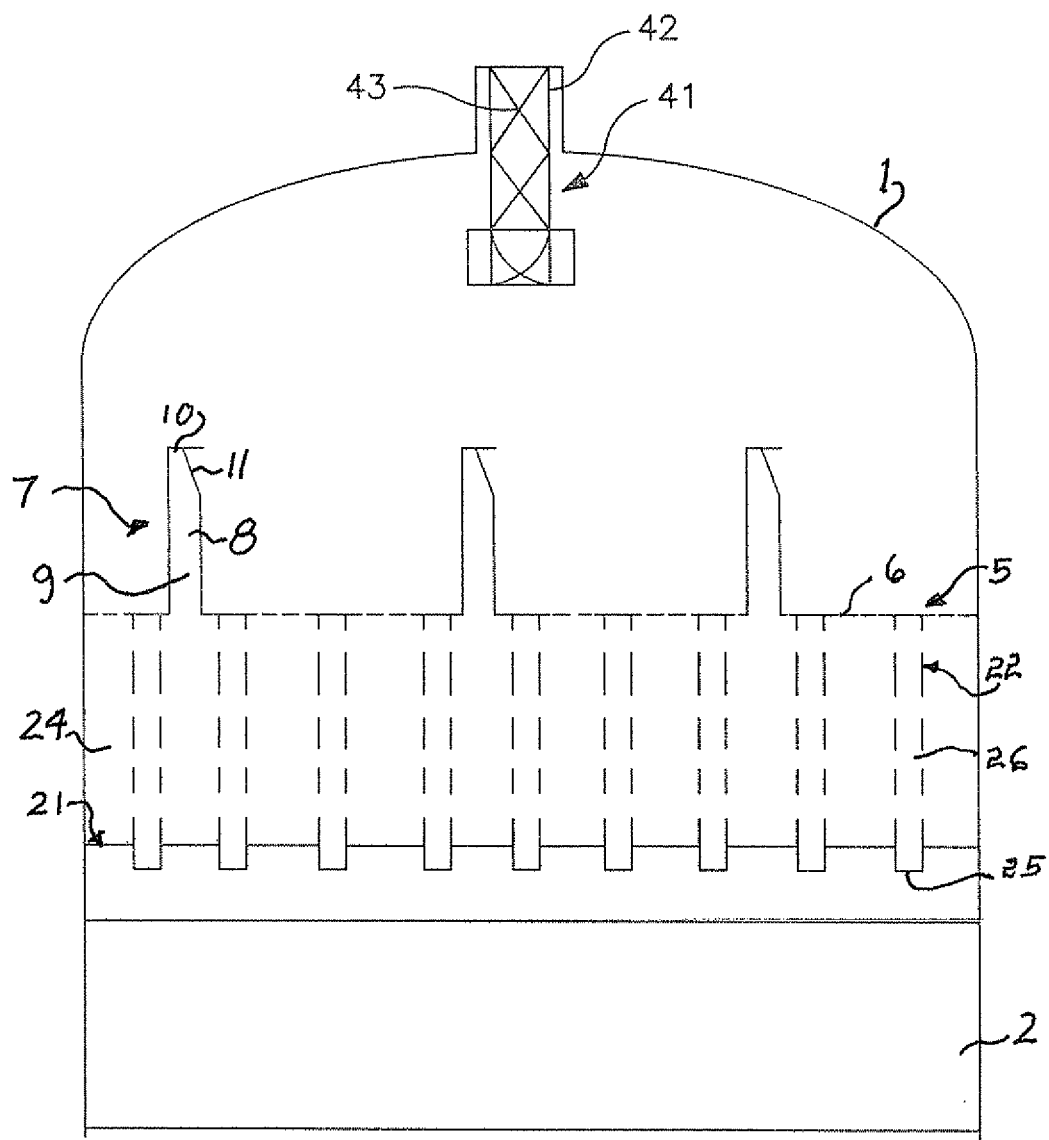
FIG. 3 illustrates in a non limitative way another embodiment of the device according to the invention wherein the gas and liquid delivery means comprises an additional separation means upstream from the upper plate.

FIG. 3 shows an embodiment wherein an additional separation system 41 is added to the gas and liquid delivery means. This system is in fact located in vertical supply line 3 at the reactor inlet.

This separation system 41 comprises a tube 42 containing a propeller 43. This propeller applies a circular motion to the flow so as to allow separation of the gas and of the liquid by centrifugal force. At the outlet of this tube 42, the gas and the liquid are discharged through two openings, not shown, provided at opposite ends from one another in the cylindrical walls of tube 42. Thus, the gas and the liquid are separated beforehand, the liquid flowing in form of a film on the outer wall of the tangential outlets and the gas being discharged through the sections located at the axis of the separation tube. If the mixture comes in form of a droplet drizzle or of a bubble flow at the reactor inlet, the preseparator improves the gas/liquid separation efficiency at the upper plate.

Figure 4:
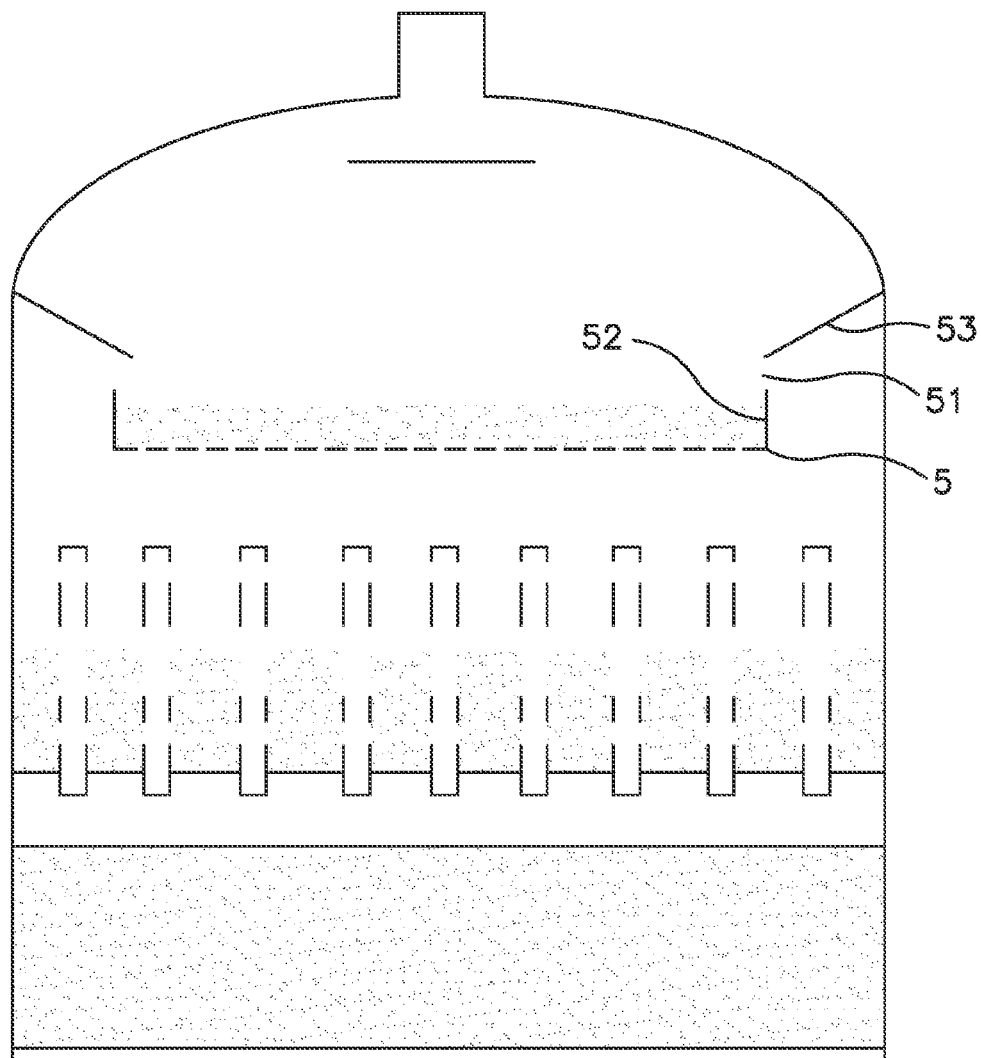
FIG. 4 illustrates in a non limitative way an embodiment wherein the separation means for carrying the gas below the upper plate comprise an annular opening provided on the periphery of the upper plate and fitted with a rim, and a cover covering said opening so as to allow passage of the gas only.

FIG. 4 shows an embodiment wherein the separation means carrying the gas below the upper plate comprise an annular opening 51 arranged on the periphery of upper plate 5 and provided with a rim 52, and a cover 53 covering said opening so as to allow passage of the gas only.

The surface of upper plate 5 delimited by rim 52 covers more than 25%, preferably more than 50% and less than 90% of the section of the granular bed. The height of the rim is calculated so as to maintain the liquid level between a minimum level corresponding to the minimum liquid flow rate and a maximum level corresponding to the maximum liquid flow rate. The minimum level is generally at least 50 mm, preferably at least 100 mm.

Cover 53 preferably has the form of an inverted truncated cone-shaped wall allowing to collect all of the liquid in the part of upper plate 5 limited by rim 52.

Figure 5:
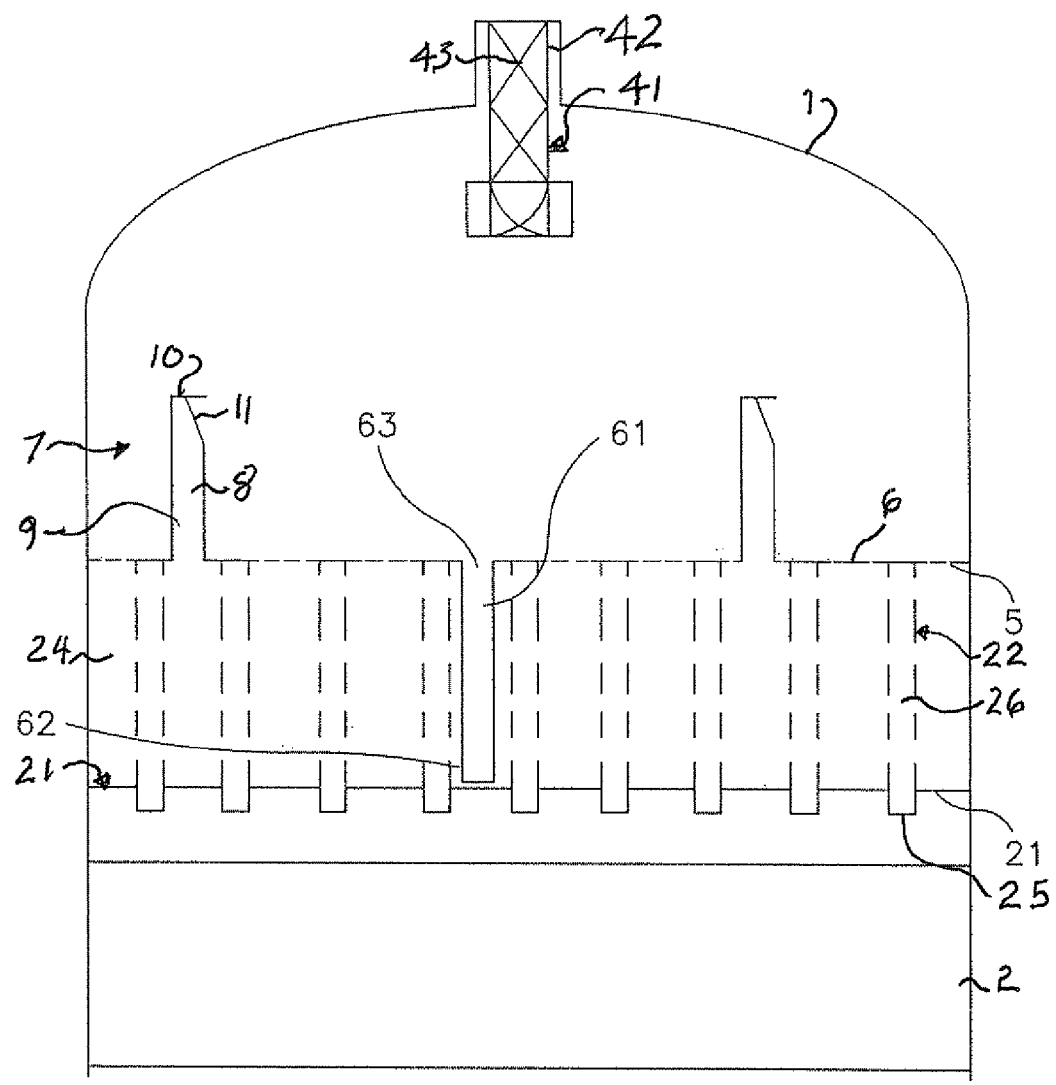
FIG. 5 illustrates in a non limitative way an embodiment wherein the means for carrying the liquid to the lower plate can comprise at least one line through the upper plate whose ends are arranged so as to be immersed in the liquid accumulated at the level of the lower plate, for one of the ends, and in the liquid accumulated at the level of the upper plate, for the other.

FIG. 5 shows an embodiment wherein the means for carrying the liquid to the lower plate can comprise at least one line 61 through upper plate 5 whose ends 62 and 63 are positioned so as to be immersed in the liquid accumulated at the level of lower plate 21, for end 62, and in the liquid accumulated at the level of the upper plate for end 63.

The number and the diameter of these lines 61 (only one is shown) are calculated so as to provide a minimum liquid level above the upper plate for a minimum liquid flow rate. This minimum level notably allows to prevent gas from being carried along towards the lower plate. This level is generally at least 50 mm, preferably at least 100 mm.

Lower end 62 of lines 61 is generally positioned below the lowest lateral orifice of risers 22 of lower plate 21. In this configuration, lines 61 are always filled with liquid and the liquid from the upper plate does not impact the interface between the gas and the liquid of the lower plate since it is directly injected below the liquid level of the lower plate. This interface therefore remains totally plane whatever the liquid and gas flow rates.

EXAMPLES

The examples given hereafter allow to illustrate the advantages of a distribution plate according to the invention in relation to a standard distribution plate. These examples were achieved from experimentations on models representing a standard type device (prior art) on the one hand and a device according to the invention on the other hand. These models were used in a 600-mm diameter reactor whose walls are transparent and comprising a granular bed. The fluids used were water and air.

The model of the standard type device comprises a plate equipped with risers, said risers having an upper part opening above the plate and a lower end communicating with the underside of the plate, the upper part of the risers being fitted with lateral orifices. In this device, the liquid is delivered by a tubular system from outside the reactor to the distribution plate so that the lower end of said tubular system remains immersed in the liquid accumulated above said plate. The lower end of the tubular system is prolonged by perforated tubes immersed in the liquid accumulated in the plate.

The model of the device according to the invention corresponds to the device shown in FIG. 2. The upper plate is provided with gas separation and carrying means 3, in the present case tubes open at their ends and fitted with a cover. The upper plate is equipped with a liquid carrying means, in the present case 5-mm diameter orifices. The lower plate is provided with 19 25-mm risers, each one of said risers having three rows of lateral orifices.

The characteristics of the risers of the lower plate of the standard device model are the same as those of the model of the device according to the invention, i.e. 19 25-mm diameter risers, each one of said risers having three rows of lateral orifices.

In both cases, the liquid flow (water) and the gas flow (air) were approximately maintained respectively at 10 kg/m$^2$/s and 0.023 kg/m$^2$/s.

Figure 6:
FIGS. 6 and 7 are associated with the examples given hereafter and show photographs allowing to see the interface between the gas and the liquid at the level of the lower plate of models of a standard type device (prior art) on the one hand and of a device according to the invention on the other hand.
Figure 7:
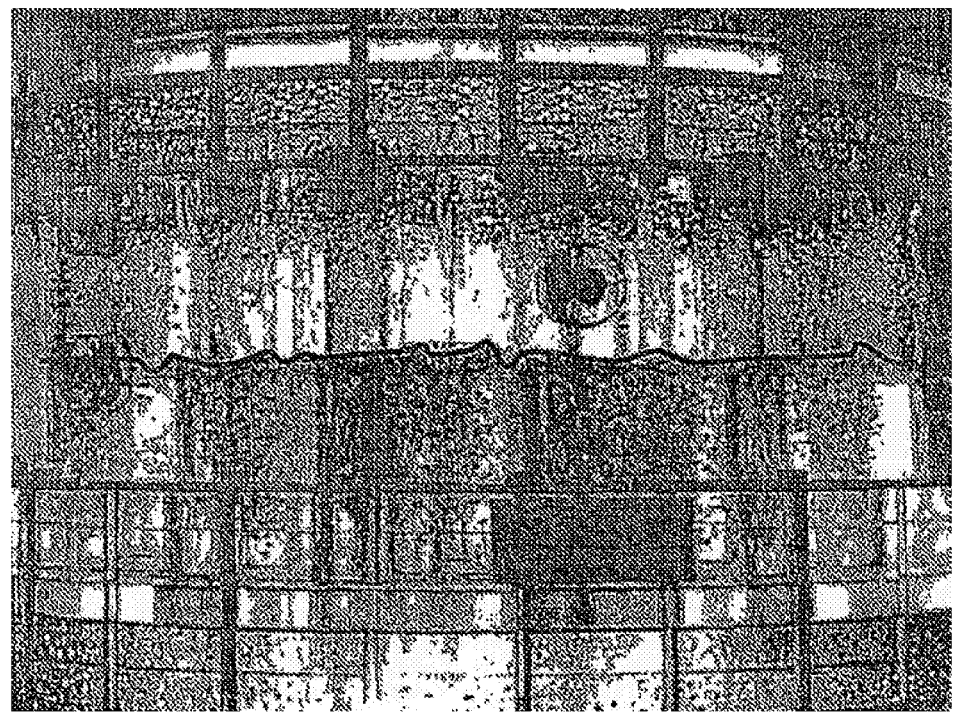

FIGS. 6 and 7 are photographs showing the interface between the gas and the liquid at the level of the lower plate of models of a standard type device (prior art) for FIG. 6 and of a device according to the invention for FIG. 7.

In the case of the standard device, the fluctuations of the interface between the gas and the liquid, shown in FIG. 6, are of the order of 50 mm. These fluctuations generate a random flow of liquid at the risers. The height of these fluctuations being of the same order as the distance between two successive orifices on the risers, the risers do not all work with the same number of orifices. These fluctuations involve liquid flow unbalances.

In the case of the device according to the invention, the fluctuations of the interface between the gas and the liquid on the lower plate, shown in FIG. 7, are of the order of 5 mm, i.e. 10 times less than in the standard system. It can be observed that the liquid level is the same upstream from all the risers. Furthermore, considering that the bubble clouds created at the interface are homogeneously distributed over the entire section of the column, contact between the gas and the liquid is homogeneous over the entire section and the flow of liquid injected is the same for all the risers.

Figure 8A:
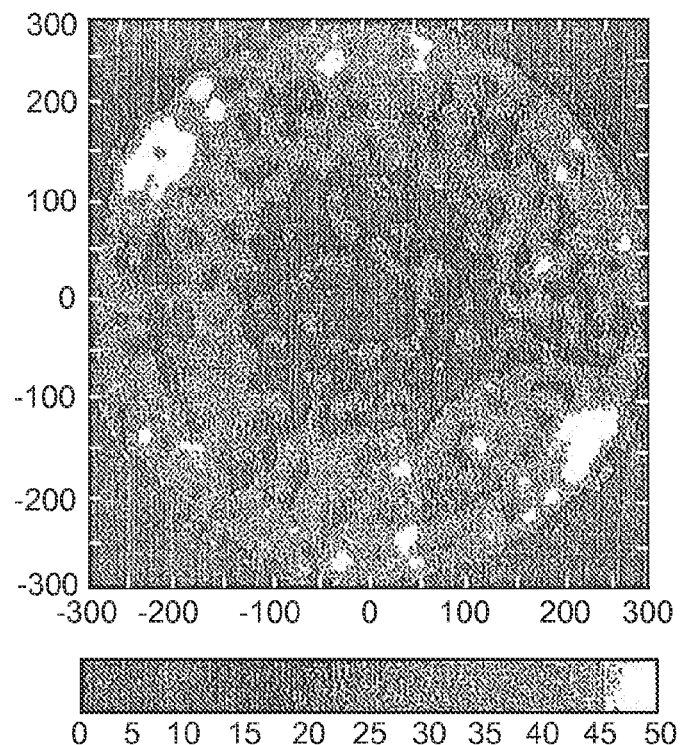
FIGS. 8a and 8b are associated with the examples given hereafter and show the gas level distributions measured on a section of the granular bed downstream from the standard type device (prior art) on the one hand and from the device according to the invention on the other hand.
Figure 8B:
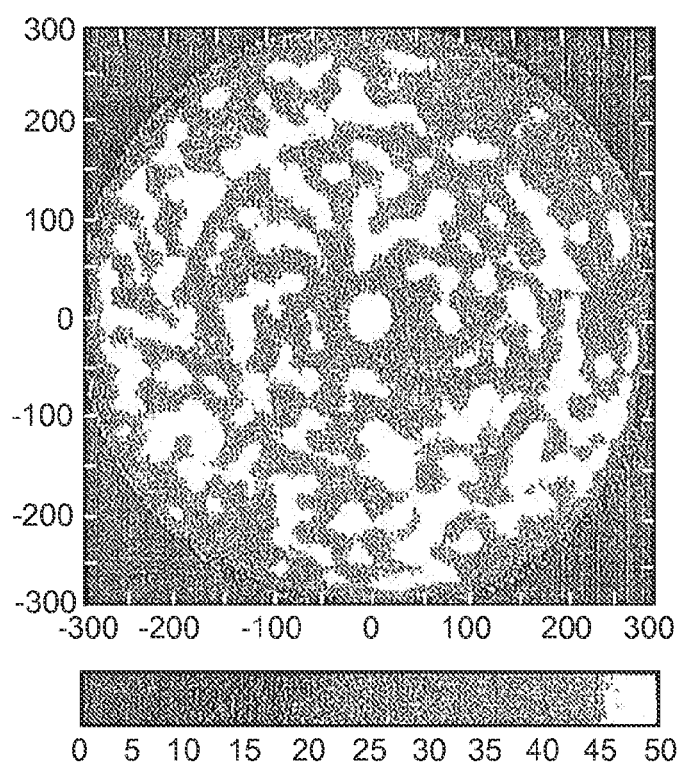

FIGS. 8a and 8b show the gas level distributions measured on a section of the granular bed downstream from the standard type device (prior art) for FIG. 8a and from the device according to the invention for FIG. 8b. The scale under each figure shows the extent of the gas level variation from black for 100% liquid to white for 100% gas.

As can be seen in FIGS. 8a and 8b, the gas level distribution is homogeneous over the entire section in the case of the device according to the invention, whereas an area with a gas deficit can be observed at the centre of the section of the bed downstream from the standard device.

In the case of the standard device, the fluctuations of the interface between the gas and the liquid on the periphery of the bed result from the impact of the gas/liquid jet from the inlet diffuser, which generates better gas supply to the risers positioned on the periphery of the column. If we define a distribution efficiency criterion as the percentage of pixels of the image for which the measured gas level is equal to the expected gas level to +/−10%, the distribution efficiency is 79% for the standard device and 96% for the device according to the invention, which corresponds to a gain of 17% of the fraction of the bed section that is properly irrigated by the gas/liquid mixture.

The invention claimed is:

1. A device for mixing and for distributing a gas and a liquid, arranged upstream from a granular bed (2), comprising a gas and liquid delivery means and a substantially horizontal lower plate (21), said lower plate being equipped with a plurality of risers (22) evenly distributed over the surface of said plate, each riser comprising an upper part (23) and a lower end (25) communicating with the underside of said plate, upper part (23) of risers (22) being provided with at least one lateral orifice (26), characterized in that the delivery means comprises a substantially horizontal upper plate (5) above which the gas and the liquid are supplied, said upper plate being provided with means for carrying the liquid to the lower plate and with gas separation and carrying means (7) and wherein the risers (22) extend to the upper plate (5) to support the upper plate (5) thereon and secure the upper and lower plates to one another, the upper plate (5) closing the upper ends of the risers (22) to minimize the head of liquid between the upper plate (5) and lower plate (21), whereby the gas is predominately injected into portions of the risers (22) that extend from the lower plate by entering orifices (26) in non-immersed in liquid portions of risers (22).

2. A device as claimed in claim 1, wherein the means for carrying the liquid to lower plate (21) comprise orifices (6) distributed over the surface of said plate.

3. A device as claimed in claim 2, wherein the density of orifices (6) of the upper plate ranges between 100 and 3000 orifices/m$^2$.

4. A device as claimed in claim 2, wherein the diameter of orifices (6) of the upper plate ranges between 1 and 20 mm.

5. A device as claimed in claim 1, wherein the means for carrying the liquid to the lower plate comprise at least one line (61) whose ends (62, 63) are positioned so as to be immersed in the liquid accumulated at the level of the lower plate, for end (62), and in the liquid accumulated at the level of the upper plate, for end (63).

6. A device as claimed in claim 5, wherein upper end (63) of line (61) is arranged at a height that is below 50 mm in relation to the upper surface of upper plate (5).

7. A device as claimed in claim 5, wherein lower end (62) of line (61) is arranged at a height that is lower than the lowest level of the lowest lateral orifice (26) of risers (22) of lower plate (21).

8. A device as claimed in claim 5, wherein line (61) comprises means for controlling the liquid level in upper plate (5).

9. A device as claimed in claim 1, wherein gas separation and carrying means (7) comprise tubes (8) open at their ends, arranged through upper plate (5) and whose upper end is provided with a cover (10) so as to allow passage of the gas only.

10. A device as claimed in claim 9, wherein the density of tubes (8) of the upper plate ranges between 3 and 30 risers/m².

11. A device as claimed in claim 1, wherein the density of risers (22) of lower plate (21) ranges between 100 and 700 risers/m².

12. A device as claimed in claim 1, wherein risers (22) of lower plate (21) are prolonged below said plate over a height ranging between 10 and 100 mm.

13. A device as claimed in claim 1, wherein the distance between lower end (25) of risers (22) of lower plate (21) and the upper surface of granular bed (2) below said plate is greater than zero and less than or equal to 300 mm.

14. A device as claimed in claim 1, wherein upper part (23) of risers (22) is provided with a plurality of lateral orifices (26) positioned at different heights.

15. A device as claimed in claim 14, wherein lateral orifices (26) along upper part (23) of risers (22) of lower plate (21) are distributed over at least two levels, the lowest level being above the upper face of lower plate (21), at a distance ranging between 50 and 300 mm in relation to lower end (25) of the risers.

16. A device as claimed in claim 1, wherein risers (22) comprise, at the upper end thereon means allowing to prevent passage of the liquid through this end.

17. A device as claimed in claim 1 wherein the risers (22) have closed tops and receive gas from non-immersed in liquid portions between the upper and lower plates through lateral orifices (26).

18. A device as claimed in claim 1 wherein the reactor (1) in the form of a chamber which has an inlet (3) including a separation system (41) comprising a tube 42 having an impeller (43) that applies circular motion to fluid entering the reactor to separate gas and liquid by centrifugal force, the liquid being deposited laterally on surfaces of the separation system for flowing into the reactor (1) and the gas being discharged axially into the reactor (1).

* * * * *

UNITED STATES PATENT AND TRADEMARK OFFICE
CERTIFICATE OF CORRECTION

PATENT NO.         : 7,500,658 B2                                          Page 1 of 1
APPLICATION NO. : 11/639305
DATED              : March 10, 2009
INVENTOR(S)        : Boyer et al.

It is certified that error appears in the above-identified patent and that said Letters Patent is hereby corrected as shown below:

Column 12, line 15 reads "comprise, at the upper end thereon means allowing to prevent" should read --comprise, at the upper end thereof means allowing to prevent--.

Signed and Sealed this

Nineteenth Day of May, 2009

JOHN DOLL
*Acting Director of the United States Patent and Trademark Office*